No. 765,250. PATENTED JULY 19, 1904.
J. P. McPHERSON.
LINE HOLDER.
APPLICATION FILED OCT. 26, 1903.
NO MODEL.
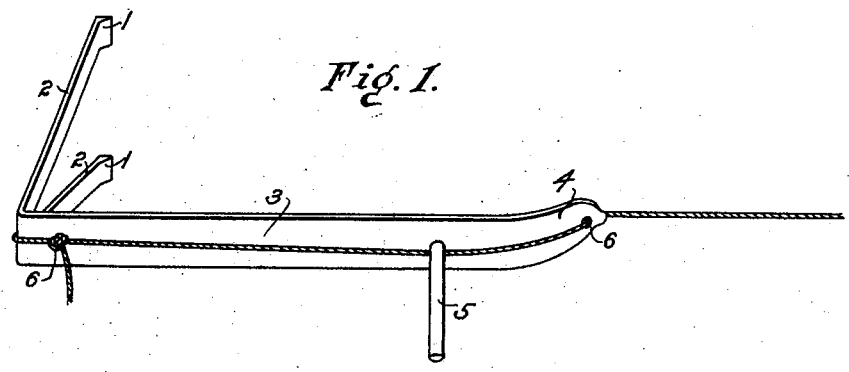
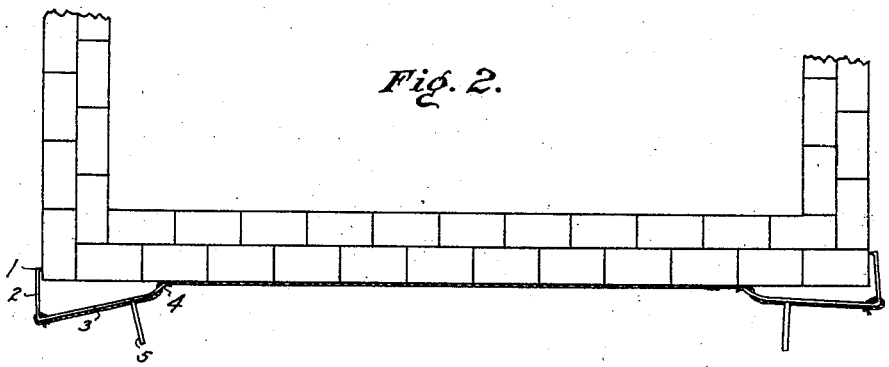
WITNESSES: INVENTOR.
George S. Clason John P. McPherson
Fred G. Fellows No. 765,250. Patented July 19, 1904.

UNITED STATES PATENT OFFICE.

JOHN P. McPHERSON, OF MORRISON, COLORADO.

LINE-HOLDER.

SPECIFICATION forming part of Letters Patent No. 765,250, dated July 19, 1904.

Application filed October 26, 1903. Serial No. 178,651. (No model.)

*To all whom it may concern:*

Be it known that I, JOHN P. McPHERSON, a citizen of the United States of America, residing at Morrison, in the county of Jefferson and State of Colorado, have invented certain new and useful Improvements in Line-Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in line-holders for holding the line used by masons and bricklayers, and is intended to supply a holder that will attach itself to the corners of the wall without defacing them and hold the line firmly against the face of the wall.

In the drawings, Figure 1 is a perspective view in detail of one of my improved line-holders. Fig. 2 is a plan view showing a portion of the wall of the building with a pair of my improved line-holders attached and held to the same by means of the line drawn taut between them.

The same reference characters indicate the same parts in both views.

1 1 represent hooks.

2 2 are arms projecting from the body portion.

4 represents a curved extension of 3 and is provided with a lateral groove upon the inner side.

5 is a handle, and 6 6 represent openings in 3, through which the line may be passed to assist in securing it.

What I claim as my invention, and desire to secure by Letters Patent, is—

1. A line-holder, combining a main frame 3, extensions 2 2, hooks 1 1, a curved nose 4, a handle 5, and suitable openings 6 6 for attaching the line thereto.

2. A line-holder, composed of a main body-piece containing perforations for attaching the line thereto and a curved guide at one extremity, while at the other extremity are hooks for catching around the corner of a building, arranged at such an angle from the main body of the holder that increased tension upon the line crowds the line-guide more closely against the wall.

3. A line-holder, intended to be used in pairs, constructed with a curved guide at one end, suitable openings for securing the line in the center, and suitable hooks at the other end for engaging the corner of a wall, and such hooks being adjusted at such an angle from the main frame of the holder that the tension of the line between two holders forces them to cling to the corners of the building and to press the guides against the face of the wall.

JOHN P. McPHERSON.

Witnesses:
J. D. STICKFORT,
H. STICKFORT.